3,283,033
CROSSLINKED OLEFIN-OLEFINIC DICARBOXYLIC ACID COMPOUND INTERPOLYMERS AND PROCESS OF PREPARATION THEREOF John H. Johnson, Kirkwood, Mo., assignor to Monsanto Company, a corporation of Delaware
No Drawing. Filed July 31, 1963, Ser. No. 299,098
12 Claims. (Cl. 260—878)

This invention relates to crosslinked olefin-olefinic dicarboxylic acid compound interpolymers. In one aspect, this invention relates to olefin-olefinic dicarboxylic acid compound interpolymers crosslinked with a polymerized olefinic ester of an olefinically unsaturated carboxylic acid as novel compositions of matter. In another aspect, this invention relates to water-dispersable alkali, ammonium, and amine salts of the above crosslinked interpolymers. In still another aspect, this invention relates to a process for crosslinking olefin-olefinic dicarboxylic acid compound interpolymers with a polymerized olefinic ester of an olefinically unsaturated carboxylic acid and the corresponding salts thereof.

The term "olefinic dicarboxylic acid compound" is used to include the acids, anhydrides, acid salts, etc.

In my copending application Serial No. 763,796, filed September 29, 1958, now Patent No. 3,165,486, a method for crosslinking olefin-maleic anhydride interpolymers using a vinyl ester of an olefinically unsaturated carboxylic acid is disclosed. Example 2 of my copending application is a representative description of the process previously used to prepare the crosslinked interpolymers. Very briefly, this process of my copending application comprises polymerizing the olefin and maleic anhydride monomers in the presence of an olefinic ester of an olefinic acid, thereby interpolymerizing the ester group into the polymer chain. Experimental data has shown however, that at the temperatures most suitable for olefin-maleic anhydride polymerization, the olefinic ester of the olefinic acid copolymerizes through its ester linkage with maleic anhydride more readily than does the olefin. The result of this selective polymerization is the rapid depletion of the crosslinking agent early in the reaction with the consequent formation of (1) polymer rich in crotonic unsaturation, and (2) polymer containing very little crotonic unsaturation. This phenomenon, although producing a crosslinked polymer, does not permit as efficient and effective use of the crosslinking agent as does my present invention. Rheological properties of aqueous solutions of salts of an olefin-olefinic dicarboxylic acid compound polymer crosslinked according to the above-mentioned copending application are difficult to reproduce accurately. This lack of reproducible rheological properties lessens the value of the crosslinked polymer in many of its uses. As a textile printing paste thickener for instance, inadequate rheological properties of the thickener may permit running of the textile pigments during or after the printing or coloring process. The value of the crosslinked interpolymer in many of its other uses is also lessened.

It is a primary object of this invention to provide olefin-olefinic dicarboxylic acid compound interpolymers crosslinked with a polymerized olefinic ester of an olefinic acid.

It is another object of this invention to provide alkali, ammonium, and amine salts of the above crosslinked interpolymers.

It is an additional object of this invention to provide a novel process for crosslinking olefin-olefinic dicarboxylic acid compound interpolymers.

Additional objects, benefits, and advantages will become apparent as the detailed description of the invention proceeds.

The polymeric compositions of this invention comprise an olefin-olefinic dicarboxylic acid compound interpolymer crosslinked with a polymerized olefinic ester of an olefinic acid. The process of preparing the above interpolymers comprises reacting an olefinic hydrocarbon and an olefinic dicarboxylic acid compound in the presence of a polymerized olefinic ester of an olefinic acid and a free radical catalyst at a temperature and pressure and for a time sufficient to cause polymerization of the monomers and crosslinking of the resultant polymer.

Olefinic hydrocarbons suitable for use in forming the above interpolymers are those having from two to four carbon atoms, e.g. ethylene, propylene, isobutylene, and n-butylenes. Suitable olefinic dicarboxylic acids are those containing a carbon to carbon double bond in the chain between the carboxyl groups, examples being maleic and fumaric acids; halogenated or alkylated maleic and fumaric acids such as citraconic acid, mesconic acid, and 1,2-dichloromaleic acid; mono- and diphenyl maleic and fumaric acids; mono- and dibenzyl maleic and fumaric acids; acids where the double bond has shifted from the 1,2 position such as glutaconic acid and 1,6-hexene-3-diolic acid; and anhydrides of the above acids. Preferred compounds are those with the double bond in the 1,2 position and with the carboxyl groups in the 1 and 2 positions. Particularly preferred compounds are the acid anhydrides of the above compounds such as maleic anhydride and mesaconic anhydride.

The crosslinking agents used in the present invention include the polymers of olefinic esters of olefinic acids wherein the ester portion is homopolymerized or copolymerized with another compound containing ethylenic unsaturation to form a polymer with pendant olefinic acyloxy groups. An alternative type of crosslinking agent are the copolymers of olefinic esters of olefinic acids and ethylenically unsaturated monomers wherein reactivity ratios favor initial copolymerization of the olefinic acyloxy radical with the comonomer leaving the ester portion pendant and capable of crosslinking olefin-olefinic dicarboxylic acid interpolymers. Examples of monomers suitable for copolymerization with the ester radical include the olefinic dicarboxylic acids and anhydrides described above, di-isopropyl maleate, vinyl laurate, vinyl benzoate, allyl acetate and vinyl chloride. Monomers suitable for copolymerization with the olefinic acyloxy radical include styrene, acrylonitrile, isobutylene and butadiene.

The olefinic ester of an olefinic acid can have from five to about thirty carbon atoms per molecule. The size of ester radicals ranges from two to about eighteen carbon atoms, preferred ester radicals being vinyl radicals. The size of the olefinic acyloxy groups ranges from three to about eighteen carbon atoms, preferably from three to six carbon atoms. Examples of such compounds include vinyl acrylate, allyl acrylate, octenyl acrylate, decenyl methacrylate, vinyl crotonate, vinyl ester of 3-butenoic acid, dodecenyl crotonate, octadecenyl crotonate, dodecenyl ester of 2-dodecenoic acid, octenyl crotonate, octenyl ester of 2-hexenoic acid, octenyl ester of 3-methyl-2-hexenoic acid, vinyl ester of 9-decenoic acid, vinyl ester of 4-pentenoic acid, vinyl ester of 3-methyl-4-pentenoic acid and many others. Particularly preferred compounds are vinyl acrylate and vinyl crotonate. Preferred polymers and copolymers prepared from the esters described hereinabove for use in crosslinking olefin-olefinic dicarboxylic acid interpolymers include polyvinyl crotonate, polyvinyl acrylate, polyvinyl crotonate-maleic anhydride, polyvinyl crotonate-styrene, polyvinyl acrylate-maleic anhydride, and polyvinyl acrylate-styrene.

Ranges of suitable molecular weights for crosslinking agents are best expressed in terms of the sizes of the molecules. In a homopolymerized vinyl crotonate of the formula

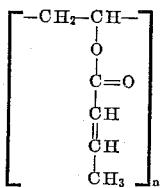

$n$ can be from 2 to 50, preferably from 5 to 35. In a copolymerized vinyl crotonate-maleic anhydride compound of the formula

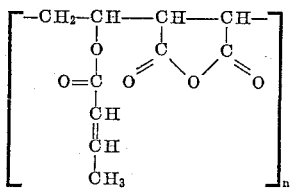

$n$ can be from 2 to 100, preferably from 5 to 50.

In a preferred aspect of this invention, an olefinic ester of an olefinic acid is polymerized or is copolymerized in substantially equimolar amounts with an olefinic compound whose polymerization reactivity ratio favors copolymerization with the ester portion of the olefinic ester of the olefinic acid. Alternatively, the olefinic ester can be copolymerized with a compound whose reactivity ratio favors copolymerization with the olefinic acyloxy radicals. The polymer or copolymer so formed is then added to a mixture of an olefin and an olefinic dicarboxylic acid compound in an amount sufficient to have about 0.1 mol percent to about 5 mol percent of the olefinic ester present, based on the reacting monomers. A preferable range of olefinic ester units is 0.3 to 3 mol percent. The olefin and olefinic dicarboxylic acid monomers are copolymerized in substantially equimolar amounts.

When ethylene and maleic anhydride are the polymerizable monomers, a preferable molar ratio of ethylene to maleic anhydride is about 4:1. When different monomers are employed, the most advantageous ratio may differ somewhat from the above ratio. Since the monomers copolymerizable in substantially a 1:1 ratio, ratios of monomers other than the optimum ratio (4:1 for ethylene-maleic anhydride) can also be used with equal, or nearly equal, success. One advantage that arises from using a molar excess of the olefin as compared to the anhydride is that the reacting monomers can be easily calculated from the amount of maleic anhydride charged to the reaction vessel in conjunction with the assumption that an equal molar amount of olefin reacts therewith. This assumption has proven to be sufficiently accurate that no practical error results from its application.

As a representative example of proportions of crosslinking polymer and reacting monomers, if 0.1 mole of vinyl crotonate is copolymerized with 0.1 mole of styrene to form a crosslinking agent, excellent crosslinking can be achieved by reacting this copolymer with 6 moles of maleic anhydride and 24 moles of ethylene. The resultant crosslinked interpolymer would contain 0.82 mol percent polymerized vinyl crotonate. Since the amount of olefinic ester units is a more accurate description of the amount of crosslinking agent than is the amount of olefinic ester copolymer, subsequent references in the specification and claims to proportions of crosslinking agent in the olefin-olefinic dicarboxylic acid compound interpolymer will be based on the amount of olefin-olefinic ester units rather than the polymerized crosslinking agent.

The production of the polymerized crosslinking agent is achieved using catalysts and conditions conventionally employed in the polymerization of unsaturated monomers. Suitable catalysts are the organic peroxides such as benzoyl peroxide, lauroyl peroxide, succinic acid peroxide, methyl ethyl ketone peroxide, hydroxyheptyl peroxide, t-butyl perbenzoate, t-butyl hydroperoxide, and bis-azo-isobutyrlnitrile. Polymerization times, temperatures and pressures vary considerably depending upon the monomer/solvent system used, type and concentration of catalysts, etc. Polymerization may require from two or three minutes to several hours; suitable temperatures range from less than 0° C. to more than 200° C.; pressures range from less than one atmosphere to several atmospheres. The reaction is preferably carried out in an inert solvent such as benzene, trichloroethane, chlorobenzene, or ethylene dichloride. In a preferred embodiment using vinyl crotonate and maleic anhydride dissolved in benzene in the presence of 0.5 mol percent benzoyl peroxide catalyst, the reactant mixture is polymerized by heating to a gentle reflux for three hours at atmospheric pressure.

The polymerization of the olefin-olefinic dicarboxylic acid compound interpolymer is subject to the same restrictions and requirements specified above for the polymerization of the crosslinking copolymer. Radiation-catalyzed polymerization can also be employed, using such high-energy radiation as X-rays, γ-rays, neutrons, etc. In a preferred embodiment using a polyvinyl crotonate-maleic anhydride crosslinking agent, maleic anhydride and ethylene dissolved in ethylene dichloride were polymerized in the presence of the crosslinking copolymer and 0.5 mol percent 2,4-dichlorobenzoyl peroxide by heating the mixture to 60° C. at 600 p.s.i.g. for 15 hours.

For use as thickeners in textile printing pastes, the interpolymers should be made using at least an amount of the crosslinking agent sufficient to make interpolymers which are substantially insoluble, i.e. at 2% polymer concentration do not form a clear solution but rather a thixotropic gel in dimethylformamide at 25° C. Further, in order to obtain the maximum benefit of their thickening properties in textile printing pastes, the interpolymers should be in the form of alkali metal, ammonium, and/or amine salts. Use of the salts of the polymer permits the formation of a dilute swollen gel or dispersion in aqueous medium.

When polymeric anhydrides are dissolved using ammonium or amine bases, an appreciable amount of amide groups are formed resulting in mixed ammonium-amide or amine-amide polymeric salts, but if the anhydrides are first hydrolyzed to the acid before neutralization, salts will be preponderantly ammonium or amine salts. The term "amine salt" will be used generically throughout this specification and the claims thereof to cover the ammonium salts, the amine salts, the ammonium-amide salts, and the amine-amide salts; however, in some cases the term "ammonium salt" will be used generically to cover only ammonium and ammonium-amide salts. Mixtures of alkali metal and amine salts can of course also be used if desired, and these mixed salts would be substantially equivalent to either alone. The amines which are preferred are the lower alkyl primary and secondary amines such as methyl amine, dimethyl amine, ethyl amine, diethyl amine, the propyl amines, the dipropyl amines, n-hexyl amine, etc. However, longer chain amines such as stearyl or palmityl primary or secondary amines, etc., or even polyamines such as ethylenediamine or diethylenetriamine, etc. are suitable for special uses. For comparison of properties, an arbitrarily selected 1.5% by weight aqueous dispersion of the interpolymer salt having a pH in the range of about 7 to about 11 for alkali metal salts, preferably from 8 to about 10, is chosen since these pH values represent the upper range of the viscosity associated with the approached full neutralization of all the carboxyls, but aqueous viscosities are still quite high and useful even with the pH as low as 5. In the case of amine salts, viscosities are high in the range of about pH 4 to about pH 10, but the preferred range is about pH 5 to about 7. These 1.5% weight dispersions in water of the salts for greatest efficiency as printing paste thickeners have a viscosity greater than 10,000 centipoises at 25° C., preferably greater than 20,000, and the viscosity can be greater than 100,000 centipoises at 25° C. Less of a higher molecular weight or higher crosslinked interpolymer salt is required for the printing paste than if a lower molecular weight or lower crosslinked material is used. The salt can be used in aqueous dispersion in water in an amount between about 0.1% and about 15% by weight, preferably 0.25 to 10%, in formulating the textile printing paste. The pH range should be chosen to yield maximum useful viscosities in accordance with the particular base used and with consideration of the pH requirements and limitations of the particular system to be thickened.

Some types of coloring materials such as pigments or dyes used for printing cotton, rayon, nylon and other fabrics are already handled as high concentrations of the pigment dispersed in an inorganic solution of synthetic resin. They are applied by conventional means such as by rollers to the fabric in the form of a pigment-in-water emulsion. The emulsion is prepared by dispersing a petroleum solvent in an unpigmented resin solution called a "clear," e.g. see Example 4 of U.S. 2,364,692. My novel thickener in the salt form could for example, be substituted for the ethyl cellulose of Example 4 of the patent with proper adjustment as to amount to compensate for differences in efficiency in thickening of these two different types of thickeners. The emulsion can be formed by mixing an aqueous dispersion of my salt with a petroleum solvent. However, it should be understood that my salts can be used as a print paste vehicle resin in a completely aqueous system without the petroleum solvents, particularly the higher crosslinked and/or higher molecular weight material. After application of the dye to the fabric, the fabric is dried and sometimes aged for color fastness. Aging and drying can be accomplished by steaming the fabric.

The crosslinked interpolymers or salts thereof are also useful as thickeners in fluids used in depleted oil wells to increase oil recovery by displacing oil from the oil sands. This process is referred to in the trade as "water-base fracturing." Normally these "water-base fracturing" fluids are used to carry sand into the formation to aid in the oil displacement. For this use the thickeners are especially effective in the form of hydrolyzed interpolymers or in the ammoniated form which would provide amide-ammonium salts of the interpolymers. To these "water-base fracturing" fluids containing the novel thickeners of the invention can be added fluid-loss or other additives, if desired. Acids such as HCl are normally used to break gels in the two-step process wherein the acid is added after the gel is pumped into the formation. Rather than adding the agent to break the gel after pumping the gel into the formation, the gel-breaking agent can be incorporated in the fluid before it is pumped into the formation. In this latter case, however, the gel-breaker must be slow acting and not break the gel until the fluid has been pumped into the formation. For example, sodium acid tetrametaphosphate can be a suitable gel-breaker for addition to fracturing fluids using my novel thickeners since it will degrade slowly by scission to produce a very acid solution. Also the salts of the half-amide half-acid form of the cross-linked interpolymers can be used as the thickeners for oil drilling muds.

The novel interpolymers, the hydrolyzed products, and salts thereof can be additionally used in the formation of various mucilaginous or colloidal gel applications such as dentrifrices, talc suspensions used in making dental impressions, bread dough, surgical jellies, creams and ointments, bulk laxatives, generally as thickeners for aqueous systems (e.g. latex paints), carrying agents, ion-exchange resins, and other materials for use in treatment of various disorders of the human and animal gastro-intestinal tract, etc. Also they can be used as suspending agents for flocculation treatment of ores for concentration or beneficiation, for mineral dressing, especially of iron, uranium, rare earth metals and molybdenum ores, etc. A further use is in industrial or sewage waste waters for coagulation to clean the water before discharging into a stream, e.g. paper mill waste water. Yet another use is to help suspend binds and improve uniformity of fibers in paper manufacture. For some of these uses the pH of the salt would be varied from substantially below 3 to substantially above 11, depending upon the particular properties desired.

The invention will be more clearly understood from the detailed description presented in the following specific examples.

*Example 1*

A quantity of 49 grams (0.5 mole) of maleic anhydride and 56 grams (0.5 mole) of vinyl crotonate are dissolved in one liter of benzene in a three liter flask equipped with a reflux condenser. To this solution is added 1.21 grams (.005 mole) of benzoyl peroxide. The vapor space above the mixture is purged with dry nitrogen. Heat is applied to start and maintain a gentle reflux. Vinyl crotonate-maleic anhydride copolymer begins to form as a solid suspension in five to ten minutes, the reaction being essentially complete in three hours. The resultant copolymer is separated by filtration and dried in a circulating air oven at 35 to 45° C. for four hours to remove excess solvent. The filtrate is analyzed for free maleic anhydride, the results indicating that 95% of the monomer is polymerized. The polymer is soluble in dimethylformamide at 1% concentration.

*Example 2*

A quantity of 112 grams of vinyl crotonate is dissolved in one liter of ethylene dichloride in a three liter flask equipped with a nitrogen sparge. To this solution is added 2.02 grams (0.005 mole) of lauroyl peroxide. The mixture is heated at 50° C. with stirring for five hours. Solvent and unreacted monomer are removed from the polymer by vacuum distillation at less than 50° C. to minimize crosslinking reactions. Analysis of unreacted monomer shows that monomer to polymer conversion is approximately 90%. The resultant polymer is soluble in dimethylformamide at 1% concentration.

*Example 3*

A quantity of 78 grams (0.75 mole) of styrene and 28 grams (0.25 mole) of vinyl crotonate are dissolved in 500 ml. of benzene in a flask equipped with a nitrogen sparge. To this solution 1.21 grams (0.005 mole) of benzoyl peroxide is added. The flask is purged with dry nitrogen and then heated to reflux temperature for four hours. Solvent and unreacted monomer are removed from the polymer by vacuum distillation at 40 to 50° C. The polymerization achieved a 90% conversion based upon the vinyl crotonate monomer. The resultant polymer is soluble in dimethylformamide at a 1% concentration.

*Example 4*

A quantity of 49 grams (0.5 mole) of maleic anhydride and 3.8 grams of a 50/50 blend of benzoyl peroxide/tricresyl-phosphate are dissolved in one liter of ethylenedichloride. To this mixture is added 0.63 gram of the vinyl crotonate-maleic anhydride copolymer prepared in Example 1. This mixture is charged to a 3 liter rocking autoclave and the vapor space pressure-flushed to 100 p.s.i. three times with ethylene. The bomb and its contents are then heated with agitation to 60° C. while the pressure of ethylene in the autoclave is adjusted to 600 p.s.i. Additional ethylene is charged into the bomb from time to time to maintain the bomb pressure at about 600 p.s.i. The polymerization reaches 95 to 98% conversion of maleic anhydride in 15 hours, thereby forming a crosslinked ethylene-maleic anhydride copolymer. The autoclave is vented and the polymer is recovered by filtration, washed several times with ethylenedichloride and dried in a vacuum oven at 105° C. for 18 hours. The yield of crosslinked polymer is about 62 grams. This product is insoluble in dimethylformamide at 1% concentration at 25° C. This polymer is then suspended in water and neutralized with stoichiometric amounts of ammonium hydroxide. A 1% aqueous solution of the ammonium salt has a Brookfield viscosity of greater than 100,000 centipoises at 25° C. The viscosity is measured using a Brookfield viscosimeter with a No. 4 spindle at 6 r.p.m. The related experiment wherein the equivalent amount of vinyl crotonate monomer (0.336 gram) is added to the charge as crosslinking agent produces a final product with only 25,000 centipoises for a 1% aqueous ammoniacal solution.

*Example 5*

An ethylene-maleic anhydride crosslinked interpolymer is prepared according to the procedure described in Example 4 except that the interpolymer is crosslinked with a polyvinyl acrylate homopolymer prepared according to the procedure described in Example 2. The ammonium salt of the crosslinked interpolymer has a Brookfield viscosity of greater than 100,000 centipoises at 25° C.

*Example 6*

This example describes the crosslinking interpolymerization of an ethylene-maleic anhydride copolymer. A quantity of 49 grams (0.5 mole) of maleic anhydride is dissolved in one liter of ethylenedichloride. To this solution is added 0.61 gram of vinyl crotonate and 1.9 grams of 2,4-dichlorobenzoyl peroxide. This mixture is then charged to a three liter rocking autoclave and the vapor space purged with nitrogen. The mixture is heated to 55° C. for three hours, after which time the vinyl crotonate has essentially all copolymerized through the vinyl ester group with a portion of the maleic anhydride. The vessel is then pressured with ethylene as described in Example 4 and the remainder of the maleic anhydride converted to a crosslinked copolymer with properties similar to those described in Example 4.

Advantages of the inventive process described above as compared to the process of the prior art reside in the following features. First, crosslinked interpolymers prepared according to the present process are more efficient, e.g. see Example 4 of this disclosure where my present process produces a 1% interpolymer dispersion in aqueous medium having a Brookfield viscosity more than four times as large as an equivalent dispersion containing a monomerically crosslinked interpolymer. Secondly, the instant process provides better control of the crosslinking reaction, thereby permitting the production of a more uniform three-dimensional network throughout the crosslinked interpolymer molecules; for many of its uses, dimensional uniformity in olefin-olefinic dicarboxylic acid compound interpolymers is desirable; for use as a textile printing paste thickener, dimensional uniformity of the interpolymer enhances its value considerably, making it much more suitable than a non-dimensionally uniform polymer.

Although the invention has been described in terms of specified embodiments which are set forth in considerable detail, it should be understood that this was done for illustrative purposes only and that the invention is not necessarily limited thereto since alternative embodiments and operating techniques will become apparent to those skilled in the art in view of this disclosure. Accordingly, modifications are contemplated which can be made without departing from the spirit of the described invention.

What is claimed is:

1. In a process for forming a crosslinked olefin-olefinic dicarboxylic acid compound interpolymer wherein an olefinic hydrocarbon and an olefinic dicarboxylic acid compound are reacted at a temperature and a pressure and for a time sufficient to cause polymerization in the presence of a free radical catalyst and a crosslinking agent, the improvement wherein said crosslinking agent is a polymerized olefinic ester of an olefinic acid.

2. A process according to claim 1 wherein the polymerized olefinic ester of an olefinic acid is a homopolymer.

3. A process according to claim 1 wherein the polymerized olefinic ester of an olefinic acid is a copolymer of an olefinic ester of an olefinic acid and an olefinic dicarboxylic acid compound.

4. A process according to claim 1 wherein the polymerized olefinic ester of an olefinic acid is a copolymer of an olefinic ester of an olefinic acid and styrene.

5. A process according to claim 1 wherein said olefinic hydrocarbon has from two to four carbon atoms, wherein said olefinic dicarboxylic acid compound is a 1,2-dicarboxylic acid anhydride with unsaturation in the 1,2 position and wherein said polymerized olefinic ester of an olefinic acid is present in the range of from 0.1 to about 5 mol percent of the reacting monomers.

6. A process according to claim 5 wherein said olefinic hydrocarbon is ethylene and said olefinic dicarboxylic acid compound is maleic anhydride.

7. A process according to claim 6 wherein the polymerized olefinic ester of an olefinic acid is polyvinyl crotonate.

8. A process according to claim 6 wherein the polymerized olefinic ester of an olefinic acid is polyvinyl acrylate.

9. A process according to claim 6 wherein the polymerized olefinic ester of an olefinic acid is a vinyl crotonate-maleic anhydride copolymer.

10. A process according to claim 6 wherein the polymerized olefinic ester of an olefinic acid is a vinyl crotonate-styrene copolymer.

11. A process according to claim 6 wherein the polymerized olefinic ester of an olefinic acid is a vinyl acrylate-maleic anhydride copolymer.

12. A process according to claim 6 wherein the polymerized olefinic ester of an olefinic acid is a vinyl acrylate-styrene copolymer.

References Cited by the Examiner

UNITED STATES PATENTS 3,111,500  11/1963  Bartt et al. _____ 260—878
3,133,040  5/1964   Sanfilippe et al. ____ 260—885

MURRAY TILLMAN, *Primary Examiner.*

D. J. BREZNER, *Assistant Examiner.*